United States Patent
Luo

(10) Patent No.: US 12,096,366 B2
(45) Date of Patent: Sep. 17, 2024

(54) TERMINAL DEVICE CONTROL METHOD AND TERMINAL DEVICE

(71) Applicant: VIVO MOBILE COMMUNICATION CO., LTD., Guangdong (CN)

(72) Inventor: Guizhao Luo, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 323 days.

(21) Appl. No.: 17/681,574

(22) Filed: Feb. 25, 2022

(65) Prior Publication Data
US 2022/0182941 A1  Jun. 9, 2022

Related U.S. Application Data

(63) Continuation of application No. PCT/CN2020/100915, filed on Jul. 8, 2020.

(30) Foreign Application Priority Data

Aug. 26, 2019 (CN) .......................... 201910792633.3

(51) Int. Cl.
*H04W 52/02* (2009.01)
*H04W 84/12* (2009.01)

(52) U.S. Cl.
CPC ... *H04W 52/0232* (2013.01); *H04W 52/0274* (2013.01); *H04W 84/12* (2013.01)

(58) Field of Classification Search
CPC ......... H04W 52/0232; H04W 52/0274; H04W 84/12; H04W 28/0221; H04W 52/0216;
(Continued)

(56) References Cited

U.S. PATENT DOCUMENTS 10,582,450 B2    3/2020  Mandiganal et al.
2004/0235536 A1 11/2004  Kim et al.
(Continued)

FOREIGN PATENT DOCUMENTS

CN         1781270 A    5/2006
CN       103228029 A    7/2013
(Continued)

OTHER PUBLICATIONS

Chen Bo et al., Towards Energy Optimization Based on Delay-sensitive traffic for WIFI Network, 2014 IEEE 11th Intl Conf on Ubiquitous Intelligence and Computing and 2014 IEEE 11th Intl Conf on Autonomic and Trusted Computing and 2014 IEEE 14th Intl Conf on Scalable Computing and Communications and Its Associated Workshops, Dec. 19, 2014, pp. 252-259.
(Continued)

*Primary Examiner* — Jae Y Lee
(74) *Attorney, Agent, or Firm* — IP & T GROUP LLP

(57) ABSTRACT

A terminal device control method includes: obtaining a target data transmission and/or reception volume of a target Wi-Fi module in the terminal device; determining a target listen interval of the target Wi-Fi module that corresponds to the target data transmission and/or reception volume, where a listen interval of the target Wi-Fi module is inversely proportional to the data transmission and/or reception volume; adjusting the listen interval of the target Wi-Fi module to the target listen interval; and waking up the target Wi-Fi module according to the target listen interval in a case that the target Wi-Fi module in a sleep state.

15 Claims, 3 Drawing Sheets

(58) Field of Classification Search
CPC ........... H04W 52/0229; H04W 52/028; H04W 52/0251; H04W 52/0225; Y02D 30/70
See application file for complete search history.

(56) References Cited

U.S. PATENT DOCUMENTS

| | | | |
|---|---|---|---|
| 2009/0098869 | A1 | 4/2009 | Torrance et al. |
| 2014/0036746 | A1* | 2/2014 | Mannemala .......... H04W 76/28 370/311 |
| 2016/0132097 | A1* | 5/2016 | Gainey ................. G06F 1/32 713/323 |
| 2016/0212703 | A1* | 7/2016 | Seok .................... H04L 1/1685 |
| 2016/0262201 | A1 | 9/2016 | Visuri et al. |
| 2017/0180963 | A1 | 6/2017 | Cavendish et al. |
| 2018/0054799 | A1 | 2/2018 | Starsinic et al. |

FOREIGN PATENT DOCUMENTS

| | | |
|---|---|---|
| CN | 103959863 A | 7/2014 |
| CN | 105682115 A | 6/2016 |
| CN | 107087283 A | 8/2017 |
| CN | 107567080 A | 1/2018 |
| CN | 108293176 A | 7/2018 |
| CN | 108616968 A | 10/2018 |
| CN | 109714812 A | 5/2019 |
| CN | 109792684 A | 5/2019 |
| CN | 110461031 A | 11/2019 |
| EP | 1684467 A1 | 7/2006 |

OTHER PUBLICATIONS

Extended European Search Report on the European Patent Application 20858082.9 issued by the European Patent Office on Oct. 4, 2022.

Zhang Yan Zhang et al., Improvement and hardware design of sleep mode in IEEE 802.16e, Computer Engineering and Applications, 2010, p. 107-111, 46(6), China Academic Journal Electronic Publishing House, China.

The First Office Action of Priority Application No. CN 201910792633.3 issued by the Chinese Patent Office on Mar. 1, 2021.

International Search Report and Written Opinion of International Application No. PCT/CN2020/100915 issued by the Chinese Patent Office on Oct. 12, 2020.

* cited by examiner

TERMINAL DEVICE CONTROL METHOD AND TERMINAL DEVICE

CROSS-REFERENCE OF RELATED APPLICATIONS

This application is a Bypass Continuation application of PCT/CN2020/100915 filed on Jul. 8, 2020, which claims priority to Chinese Patent Application No. 201910792633.3 filed on Aug. 26, 2019, which are incorporated herein by reference in their entirety.

TECHNICAL FIELD

Embodiments of the present disclosure relate to the field of communications technologies, and in particular, to a terminal device control method and a terminal device.

BACKGROUND

With the continuous development of Wi-Fi technologies, Wi-Fi access points are deployed in more and more public places, so that users can easily connect to the Internet through one or more Wi-Fi access points in major public places and at home, to perform the Internet access function. At present, most terminal devices are equipped with Wi-Fi modules, and communicate with Wi-Fi access points through the Wi-Fi modules.

Generally, in a case that a Wi-Fi module is in a sleep state, a terminal device wakes up the Wi-Fi module according to a default listen interval, to monitor whether data needs to be sent or received, that is, regardless of whether the Wi-Fi module needs to send or receive data, the Wi-Fi module is woken up at a fixed time. Therefore, this causes unnecessary power consumption, thereby accelerating battery power consumption of the terminal device.

SUMMARY

According to a first aspect, an embodiment of the present disclosure provides a terminal device control method, including:
  obtaining a target data transmission and/or reception volume of a target Wi-Fi module in the terminal device;
  determining a target listen interval of the target Wi-Fi module that corresponds to the target data transmission and/or reception volume, where a listen interval of the target Wi-Fi module is inversely proportional to the data transmission and/or reception volume;
  adjusting the listen interval of the target Wi-Fi module to the target listen interval; and
  waking up the target Wi-Fi module according to the target listen interval in a case that the target Wi-Fi module is in a sleep state.

According to a second aspect, an embodiment of the present disclosure further provides a terminal device. The terminal device includes the following modules:
  an obtaining module, configured to obtain a target data transmission and/or reception volume of a target Wi-Fi module in the terminal device;
  a determining module, configured to determine a target listen interval of the target Wi-Fi module that corresponds to the target data transmission and/or reception volume, where a listen interval of the target Wi-Fi module is inversely proportional to the data transmission and/or reception volume;
  an adjusting module, configured to adjust the listen interval of the target Wi-Fi module to the target listen interval; and
  a waking-up module, configured to wake up the target Wi-Fi module according to the target listen interval in a case that the target Wi-Fi module is in a sleep state.

According to a third aspect, the embodiments of the present disclosure provide a terminal device, including: a processor, a memory, and a computer program stored in the memory and executable on the processor, where when the computer program is executed by the processor, the steps of the terminal device control method according to the foregoing first aspect are implemented.

According to a fourth aspect, the embodiments of the present disclosure provide a non-transitory computer-readable storage medium, where a computer program is stored in the non-transitory computer-readable storage medium, and when the computer program is executed by a processor, the steps of the terminal device control method according to the foregoing first aspect are implemented.

DETAILED DESCRIPTION OF THE EMBODIMENTS

Figure 1:
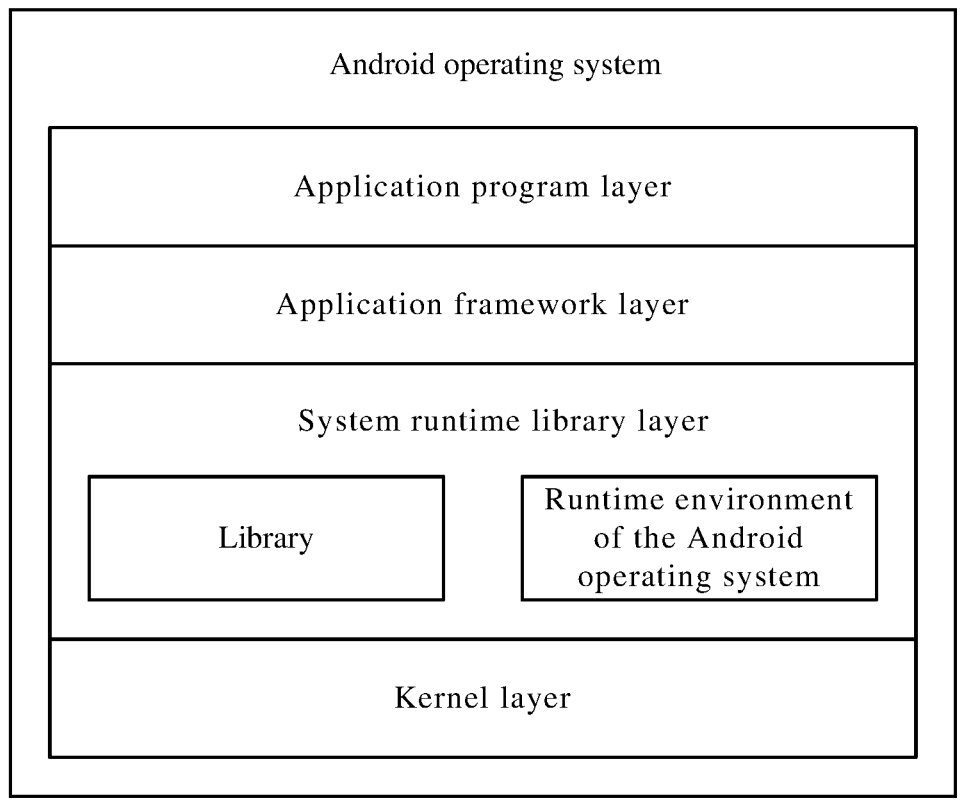
FIG. 1 is a schematic architectural diagram of a possible Android operating system according to an embodiment of the present disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by those of ordinary skill in the art based on the embodiments of the present application should fall within the protection scope of the present application.

It should be noted that "/" in this specification represents or. For example, AB may represent A or B; "and/or" in this specification merely describes an association relationship of associated objects, and indicates that there may be three relationships. For example, A and/or B may represent that there are three cases: There is only A, there are both A and B, and there is only B.

It should be noted that "multiple" in this specification means two or more.

It should be noted that in the embodiments of the present disclosure, the term such as "exemplary" or "for example" is used to indicate an example, an instance, or a description. Any embodiment or design scheme described as "exemplary" or "for example" in the embodiments of this disclosure should not be construed as being more preferred or advantageous than other embodiments or design schemes. Specifically, the words such as "exemplary" or "for example" are used to present related concepts in a specific manner.

The terminal device control method provided by the embodiments of the present disclosure may be performed by the terminal device (including a mobile terminal device and a non-mobile terminal device), or may be performed by functional modules and/or functional entities in the terminal device that can implement the terminal device control method. This may be specifically determined according to actual usage requirements, and is not limited in the embodiments of the present disclosure. The terminal device is taken as an example below to describe the terminal device control method provided in the embodiments of the present disclosure.

The terminal device in the embodiments of the present disclosure may be a mobile terminal device or a non-mobile terminal device. The mobile terminal device may be a mobile phone, a tablet computer, a notebook computer, a palmtop computer, a vehicle-mounted terminal device, a wearable device, an ultra-mobile personal computer (UMPC), a netbook, a personal digital assistant (PDA), or the like. The non-mobile terminal device may be a personal computer (PC), a television (TV), a teller machine, a self-service machine, or the like. This is not specifically limited in the embodiment of the present disclosure.

The terminal device in the embodiments of the present disclosure is a terminal device with one or more Wi-Fi modules. The terminal device with multiple Wi-Fi modules can connect to multiple Wi-Fi access points at the same time, which can effectively improve network access efficiency and improve network access stability.

Exemplarily, the Wi-Fi module includes: an awake state and a sleep state. The Wi-Fi module can send and receive data normally in an awake state; and stops sending and receiving data in a sleep state. It can be understood that the sleep state means that the Wi-Fi module does not send and receive data even if there is data.

Exemplarily, the awake state includes: an active state (active) and an inactive state (inactive). In a case that the Wi-Fi module is in an active state, the Wi-Fi module has data transmission and reception. In a case that the Wi-Fi module is in an inactive state, the Wi-Fi module has no data transmission and reception.

Take a terminal device with one Wi-Fi module as an example.

In a case that the Wi-Fi module of the terminal device is in an awake state, if the Wi-Fi module does not send or receive data within a predetermined time a, the terminal device controls the Wi-Fi module to enter a sleep state, where the predetermined time a is inactivity timeout (ITO).

After the Wi-Fi module of the terminal device enters the sleep state, the Wi-Fi access point buffers data of the terminal device during the sleep period of the Wi-Fi module, and the terminal device wakes up the Wi-Fi module and listens for (or receives) a beacon frame from a Wi-Fi access point every predetermined time b. The terminal device can know whether the Wi-Fi access point buffers the data of the terminal device based on the beacon frame. Generally, if the Wi-Fi access point buffers the data of the terminal device, this is marked in the beacon frame. The predetermined time b is a listen interval. The beacon frame is a data frame broadcast by the Wi-Fi access point on a regular basis (100 milliseconds by default), and includes basic information of the Wi-Fi access point.

However, the listen interval of the Wi-Fi module is counted based on a beacon interval, and usually is 1 beacon interval by default. Therefore, after the Wi-Fi module enters the sleep state, the terminal device wakes up the Wi-Fi module according to the default listen interval (that is, the 1 beacon interval). In this way, in a case that the data transmission is infrequent, the terminal device wakes up the Wi-Fi module frequently, causing unnecessary power consumption. For a terminal device with multiple Wi-Fi modules, this causes more unnecessary power consumption.

To solve the above problems, embodiments of the present disclosure provide a terminal device control method and a terminal device. Since the listen interval of the target Wi-Fi module is inversely proportional to the data transmission and/or reception volume, the terminal device in the embodiments of the present disclosure can determine a suitable target monitoring interval by obtaining the data transmission and/or reception volume of the target Wi-Fi module, and then adjust the listen interval of the target Wi-Fi module to the target monitoring interval. In this way, in a case that the target Wi-Fi module is in a sleep state, the target Wi-Fi module can be woken up according to the target listen interval, to extend the listen interval of the target Wi-Fi module in a case that data transmission is infrequent, and reduce the wake-up frequency in a case that the target Wi-Fi module is in a sleep state, to save power.

The terminal device provided in the embodiments of the present disclosure may be a terminal device with an operating system. The operating system may be an Android operating system, or may be an iOS operating system or other possible operating systems, which is not specifically limited in the embodiments of the present disclosure.

The following uses the Android operating system as an example to introduce a software environment applicable to the terminal device control method provided by the embodiments of the present disclosure.

FIG. 1 is a schematic architectural diagram of a possible Android operating system according to an embodiment of the present disclosure. In FIG. 1, the architecture of the Android operating system includes 4 layers, which are an application layer, an application framework layer, a system runtime library layer, and a kernel layer (such as a Linux kernel layer).

The application layer includes various applications in the Android operating system (that include system applications and third-party applications).

The application framework layer is an application framework, and a developer may develop some applications based on the application framework layer by following a rule of developing the application framework.

The system runtime library layer includes a library (also referred to as a system library) and a running environment of the Android operating system. The library mainly provides various resources required in the Android operating system. The running environment of the Android operating system is used for providing a software environment for the Android operating system.

The kernel layer is an operating system layer of the Android operating system, and is the lowest layer in software layers of the Android operating system. The kernel layer provides core system services and hardware-related drivers for the Android operating system based on the Linux kernel.

The Android operating system is taken as an example. In the embodiments of the present disclosure, based on the system architecture of the Android operating system as shown in FIG. 1, developers can develop software programs that implement the terminal device control method provided by the embodiments of the present disclosure, so that the terminal device control method can be performed based on the Android operating system as shown in FIG. 1. That is, by running the software program in the Android operating system, the processor or the terminal device can implement the terminal device control method provided by the embodiments of the present disclosure.

Figure 2:
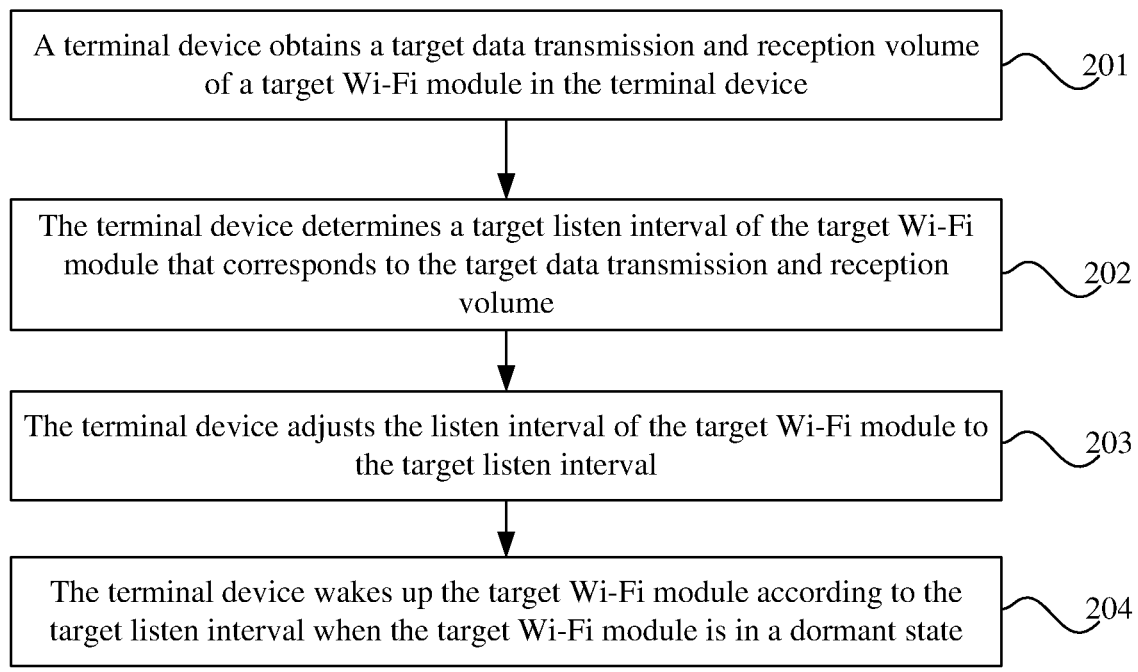
FIG. 2 is a schematic flowchart of a terminal device control method according to an embodiment of the present disclosure.

The following describes a terminal device control method according to an embodiment of the present disclosure with reference to a flowchart of the terminal device control method shown in FIG. 2. FIG. 2 is a schematic flowchart of a terminal device control method according to an embodiment of the present disclosure, including step 201 to step 204.

Step 201: A terminal device obtains a target data transmission and/or reception volume of a target Wi-Fi module in the terminal device.

In the embodiments of the present disclosure, the data transmission and/or reception volume is the number of data packets sent or received by the target Wi-Fi module.

In the embodiments of the present disclosure, the terminal device may obtain the target data transmission and/or reception volume of the target Wi-Fi module in a case that the target Wi-Fi module is in the awake state, or may obtain the target data transmission and/or reception volume of the target Wi-Fi module in a case that the target Wi-Fi module is in the sleep state, which is not limited in this embodiment of the present disclosure.

Optionally, in the embodiments of the present disclosure, the terminal device has one Wi-Fi module, and the target Wi-Fi module may be the Wi-Fi module; or the terminal device has at least two Wi-Fi modules, and the target Wi-Fi module may be at least one of the at least two Wi-Fi modules.

Exemplarily, in a case that there are at least two target Wi-Fi modules, the terminal device may obtain target data transmission and/or reception volumes of the target Wi-Fi modules of the terminal device respectively.

Further optionally, before Step 201, the method further includes step A1:

Step A1: The terminal device uses a Wi-Fi module that meets a predetermined condition as the target Wi-Fi module.

In the embodiments of the present disclosure, the predetermined condition includes at least one of the following: the Wi-Fi module has an active socket, or the Wi-Fi module is connected to a Wi-Fi access point.

A terminal device with 2 Wi-Fi modules (that is, a Wi-Fi module 1 and a Wi-Fi module 2) is taken as an example. In a case that the Wi-Fi module 1 is connected to a Wi-Fi access point and the Wi-Fi module 1 has an active socket, the terminal device uses the Wi-Fi module 1 as the target Wi-Fi module.

Step 202: The terminal device determines a target listen interval of the target Wi-Fi module that corresponds to the target data transmission and/or reception volume.

In the embodiments of the present disclosure, a listen interval of the target Wi-Fi module is inversely proportional to the data transmission and/or reception volume.

Exemplarily, the listen interval may be a beacon listen interval, and the unit is the number of beacons.

In the embodiments of the present disclosure, different data transmission and/or reception volumes correspond to different listen intervals. For example, in a case that the target Wi-Fi module has a large data transmission and/or reception volume, the listen interval needs to be shorter, so that the target Wi-Fi module can be quickly woken up to send and receive data. In a case that the target Wi Fi module has a small data transmission and/or reception volume, the listen interval can be extended to reduce the number of times the target Wi Fi module receives and sends data.

Optionally, in the embodiments of the present disclosure, the terminal device may determine, based on a preset first correspondence table, a listen interval corresponding to the data transmission and/or reception volume. The first correspondence table is used to represent a correspondence between a data transmission and/or reception volume and a listen interval. The correspondence table includes: X data transmission and/or reception volumes and Y listen intervals. One monitoring interval corresponds to at least one data transmission and/or reception volume, X and Y are positive integers, and X is greater than or equal to Y. Exemplarily, after obtaining the data transmission and/or reception volume, the terminal device finds the listen interval corresponding to the data transmission and/or reception volume from the correspondence table.

In an example, in the correspondence, one listen interval corresponds to one data transmission and/or reception volume interval, that is, a data transmission and/or reception volume in the data transmission and/or reception volume interval corresponds to a same listen interval.

Optionally, in the embodiments of the present disclosure, the target data transmission and/or reception volume is a data transmission and/or reception volume of the target Wi-Fi module within a first predetermined time period. The first predetermined time period may be set according to an actual usage requirement, and is not limited in the embodiments of the present disclosure.

Optionally, in the embodiments of the present disclosure, step 201 may include step 201a or step 201b:

Step 201a: The terminal device periodically obtains the target data transmission and/or reception volume of the target Wi-Fi module in a case that the target Wi-Fi module is in the sleep state.

Exemplarily, in a case that the target Wi-Fi module is in the sleep state, the terminal device periodically obtains the target data transmission and/or reception volume of the target Wi-Fi module in the awake state. For example, if the target data transmission and/or reception volume of the target Wi-Fi module in the awake state is 0, it means that the target Wi-Fi module does not need to send and receive data. In this case, the listen interval may be extended to reduce the wake-up frequency of the target Wi-Fi module in the sleep state, to further save power. If the target data transmission and/or reception volume of the target Wi-Fi module in the awake state is not 0, it means that the target Wi-Fi module will enter the awake state.

Step 201b: The terminal device periodically obtains the target data transmission and/or reception volume of the target Wi-Fi module in a case that the target Wi-Fi module is in an awake state.

Exemplarily, the terminal device periodically obtains the target data transmission and/or reception volume of the target Wi-Fi module in a case that the target Wi-Fi module is in the awake state, which can improve the accuracy of statistics collection on the data transmission and/or reception volume.

Exemplarily, the terminal device may periodically obtain the data transmission and/or reception volume of the target Wi-Fi module, and determine the corresponding listen interval of the target Wi-Fi module after obtaining the target data transmission and/or reception volume.

In an example, the terminal device may periodically obtain the data transmission and/or reception volume of the target Wi-Fi module, and each time a data transmission and/or reception volume is obtained, determine the corresponding listen interval by using the data transmission and/or reception volume as the target data transmission and/or reception volume.

For example, the data transmission and/or reception volume is the number of data packets sent and received by the target Wi-Fi module. For example, the terminal device uses 3 seconds as a cycle. In a case that the number of data packets sent and received by the target Wi-Fi module and obtained by the terminal device in the first cycle is more than 30 (that is, the target data transmission and/or reception volume), the corresponding target listen interval is 1 beacon interval. In a case that the number of data packets sent and received by the target Wi-Fi module and obtained by the terminal device in the second cycle is more than 10 and less than or equal to 30 (that is, the target data transmission and/or reception volume), the corresponding target monitoring interval is 3 beacon intervals. In a case that the number of data packets sent and received by the target Wi-Fi module and obtained by the terminal device in the third cycle is less than or equal to 10 (that is, the target data transmission and/or reception volume), the corresponding target listen interval is 9 beacon intervals.

In another example, the terminal device periodically obtains the data transmission and/or reception volume of the target Wi-Fi module within a predetermined time period, averages all obtained data transmission and/or reception volumes, and uses the average value as the target data transmission and/or reception volume, to obtain the listen interval corresponding to the target data transmission and/or reception volume.

Step 203: The terminal device adjusts the listen interval of the target Wi-Fi module to the target listen interval.

Step 204: The terminal device wakes up the Wi-Fi module according to the target listen interval in a case that the target Wi-Fi module is in a sleep state.

For example, the terminal device wakes up the target Wi-Fi module according to the target listen interval in a case that the target Wi-Fi module is in a sleep state, and listens to obtain whether the Wi-Fi access point buffers data of the terminal device. If it is obtained through listening that the Wi-Fi access point buffers the data of the terminal device, the terminal device controls the target Wi-Fi module to enter the awake state and informs this to the Wi-Fi access point, and then the Wi-Fi access point sends the buffered data to the terminal device. If it is not obtained through listening that the target Wi-Fi access point buffers the data of the terminal device, the target Wi-Fi module continues to sleep. At the next target listen interval, the target Wi-Fi module continues to be woken up, and whether the Wi-Fi access point buffers the data of the terminal device is obtained through listening. Repeat the above steps, which is not repeated herein.

Optionally, in the embodiments of the present disclosure, the terminal device has multiple Wi-Fi modules, and the terminal device can adjust a listen interval of each target Wi-Fi module and also can power off an inactive Wi-Fi module.

In an example, in a case that the terminal device adjusts the listen interval of the target Wi-Fi module, the terminal device can also listen whether the multiple Wi-Fi modules have active sockets. If a Wi-Fi module does not have an active socket (that is, the Wi-Fi module is an inactive Wi-Fi module), the terminal device disconnects the Wi-Fi module from a corresponding Wi-Fi access point and further powers off the Wi-Fi module, to further save power. The socket means that two programs on a network implement data exchange through a two-way communication connection. One end of the connection is called a socket, and an active socket means that the socket has data transmission and reception.

It should be noted that in a case that it is obtained through listening that all Wi-Fi modules in the terminal device have no active sockets, the terminal device needs to reserve one Wi-Fi module, that is, to ensure that one Wi-Fi module is not powered off to maintain necessary communication.

Two Wi-Fi modules (that is, a Wi-Fi module 3 and a Wi-Fi module 4) are taken as an example. If the terminal device obtains through listening that the Wi-Fi module 3 has no active socket, the terminal device disconnects the Wi-Fi module 3 from a corresponding Wi-Fi access point, and further powers off the Wi-Fi module 3, to further save power.

In another example, in a case that the terminal device adjusts the listen interval of the target Wi-Fi module, if the number of Wi-Fi access points connected to the multiple Wi-Fi modules is smaller than the number of Wi-Fi modules in the terminal device, it indicates that there is an inactive Wi-Fi module at present. In this case, the Wi-Fi module can be powered off, to further save power.

Two Wi-Fi modules (that is, a Wi-Fi module 5 and a Wi-Fi module 6) are taken as an example. If the terminal device detects that the Wi-Fi module 5 is not connected to the Wi-Fi access point, the terminal device powers off the Wi-Fi module 5, to further save power.

In the terminal device control method in the embodiments of the present disclosure, since the listen interval of the target Wi-Fi module is inversely proportional to the data transmission and/or reception volume, the terminal device in the embodiments of the present disclosure can determine a suitable target monitoring interval by obtaining the data transmission and/or reception volume of the target Wi-Fi module, and then adjust the listen interval of the target Wi-Fi module to the target monitoring interval. In this way, in a case that the target Wi-Fi module is in a sleep state, the target Wi-Fi module can be woken up according to the target listen interval, to extend the listen interval of the target Wi-Fi module in a case that data transmission is infrequent, and reduce the wake-up frequency in a case that the target Wi-Fi module is in a sleep state, to save power.

Optionally, in the embodiments of the present disclosure, the terminal device may further shorten the duration in which the target Wi-Fi module is in the awake state by adjusting the inactive duration in which the target Wi-Fi module enters the sleep state.

Exemplarily, before step 204, the method further includes the following step 204*a* to step 204*d*:

Step 204*a*: The terminal device obtains channel usage of the target Wi-Fi module.

Exemplarily, if it is detected that the target Wi-Fi module is in the inactive state in a case that the target Wi-Fi module is in the awake state, the terminal device obtains the channel usage rate of the Wi-Fi module.

Exemplarily, the channel usage of the target Wi-Fi module may be obtained from a beacon frame sent by the Wi-Fi access point.

Exemplarily, the terminal device may obtain the channel usage of the target Wi-Fi module at each time point in a case that the target Wi-Fi module is in the active state. For example, the target Wi-Fi module of the terminal device lasts for 3 seconds in the active state, which is divided into three time points: the first second moment, the second second moment, and the third second moment. The terminal device respectively obtains channel usage at these three time points.

Step 204b: The terminal device determines a target inactive duration of the target Wi-Fi module that corresponds to the channel usage.

In the embodiments of the present disclosure, the channel usage of the target Wi-Fi module is directly proportional to an inactive duration.

In the embodiments of the present disclosure, different channel usage corresponds to different inactive durations.

Step 204c: The terminal device adjusts the inactive time of the target Wi-Fi module to the target inactive time.

Step 204d: The terminal device makes the target Wi-Fi module to enter a sleep state after the target inactive duration.

Optionally, in this embodiment of the present disclosure, the terminal device may determine, based on a preset second correspondence table, the inactive duration corresponding to the channel usage. The second correspondence table is used to represent the correspondence between the channel usage and the inactive duration. The correspondence table includes: M channel usage and N inactive durations, one inactive duration corresponds to at least one channel usage, M and N are positive integers, and M is greater than or equal to N. Exemplarily, after obtaining the channel usage, the terminal device finds the inactive duration corresponding to the channel usage from the correspondence table.

In an example, in the correspondence, one inactive duration corresponds to one channel usage interval, that is, channel usage in the channel usage interval all corresponds to the same inactive duration. For example, in a case that the channel usage is greater than or equal to 50%, the inactive time is adjusted to 200 milliseconds, and the Wi-Fi module enters the sleep state after 200 milliseconds. In a case that the channel usage is greater than or equal to 30% and less than 50%, the inactive time is adjusted to 100 milliseconds, and the Wi-Fi module enters the sleep state after 100 milliseconds. In a case that the channel usage is greater than or equal to 15% and less than 30%, the inactive time is adjusted to 50 milliseconds, and the Wi-Fi module enters the sleep state after 50 milliseconds. In a case that the channel usage is less than 15%, the inactive time is adjusted to 25 ms, and the Wi-Fi module enters the sleep state after 25 ms.

In this embodiment of the present disclosure, the inactive duration is a duration used to determine whether data needs to be sent and received. Since the target Wi-Fi module can transmit data at a faster speed when the channel usage is relatively low, the target Wi-Fi module can determine, in a shorter time when the channel usage rate is relatively low, whether data needs to be transmitted (that is, in a case that the channel usage is relatively low, the inactive time can be shortened). In this case, shortening the inactive time can make the target Wi-Fi module enter the sleep state faster, to further save power.

Figure 3:
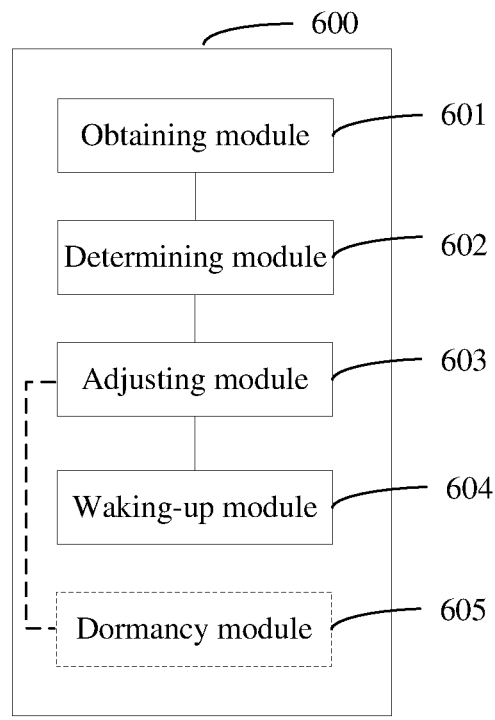
FIG. 3 is a first schematic structural diagram of a terminal device according to an embodiment of the present disclosure.

FIG. 3 is a possible schematic structural diagram of a terminal device according to an embodiment of the present invention. As shown in FIG. 3, the terminal device 600 includes an obtaining module 601, a determining module 602, an adjusting module 603, and a waking-up module 604.

The obtaining module 601 is configured to obtain a target data transmission and/or reception volume of a target Wi-Fi module in the terminal device.

The determining module 602 is configured to determine a target listen interval of the target Wi-Fi module that corresponds to the target data transmission and/or reception volume obtained by the obtaining module 601, where a listen interval of the target Wi-Fi module is inversely proportional to the data transmission and/or reception volume.

The adjusting module 603 is configured to adjust the listen interval of the target Wi-Fi module to the target listen interval determined by the determining module 602.

The waking-up module 604 is configured to wake up the target Wi-Fi module according to the target listen interval adjusted by the adjusting module 603 and in a case that the target Wi-Fi module is in a sleep state.

Optionally, the target data transmission and/or reception volume is a data transmission and/or reception volume of the target Wi-Fi module within a first predetermined time period.

Optionally, the obtaining module 601 is configured to periodically obtain the target data transmission and/or reception volume of the target Wi-Fi module in a case that the target Wi-Fi module is in a sleep state.

Optionally, as shown in FIG. 3, the terminal device 600 further includes: a dormancy module 605; where the obtaining module 601 is further configured to obtain channel usage of the target Wi-Fi module; the determining module 602 is further configured to determine a target inactive duration of the target Wi-Fi module that corresponds to the channel usage obtained by the obtaining module 601, where the channel usage of the target Wi-Fi module is directly proportional to an inactive duration; the adjusting module 603 is further configured to adjust an inactive duration of the target Wi-Fi module to the target inactive duration determined by the determining module 602; where the inactive duration is an duration in which the target Wi-Fi module is in an inactive state of an awake state; and the dormancy module 605 is configured to make the target Wi-Fi module to enter a sleep state after the target inactive duration adjusted by the adjusting module 603.

Optionally, the terminal device has at least two Wi-Fi modules, and the target Wi-Fi module is at least one of the at least two Wi-Fi modules.

Optionally, the determining module 602 is further configured to use a Wi-Fi module that meets a predetermined condition as the target Wi-Fi module; where the predetermined condition includes at least one of the following: the Wi-Fi module has an active socket, or the Wi-Fi module is connected to a Wi-Fi access point.

In the terminal device in the embodiments of the present disclosure, since the listen interval of the target Wi-Fi module is inversely proportional to the data transmission and/or reception volume, the terminal device in the embodiments of the present disclosure can determine a suitable target monitoring interval by obtaining the data transmission and/or reception volume of the target Wi-Fi module, and then adjust the listen interval of the target Wi-Fi module to the target monitoring interval. In this way, in a case that the target Wi-Fi module is in a sleep state, the target Wi-Fi module can be woken up according to the target listen interval, to extend the listen interval of the target Wi-Fi module in a case that data transmission is infrequent, and reduce the wake-up frequency in a case that the target Wi-Fi module is in a sleep state, to save power.

The terminal device provided in this embodiment of the present disclosure can implement the processes that are implemented by the terminal device in the foregoing method embodiment. To avoid repetition, details are not described herein again.

Figure 4:
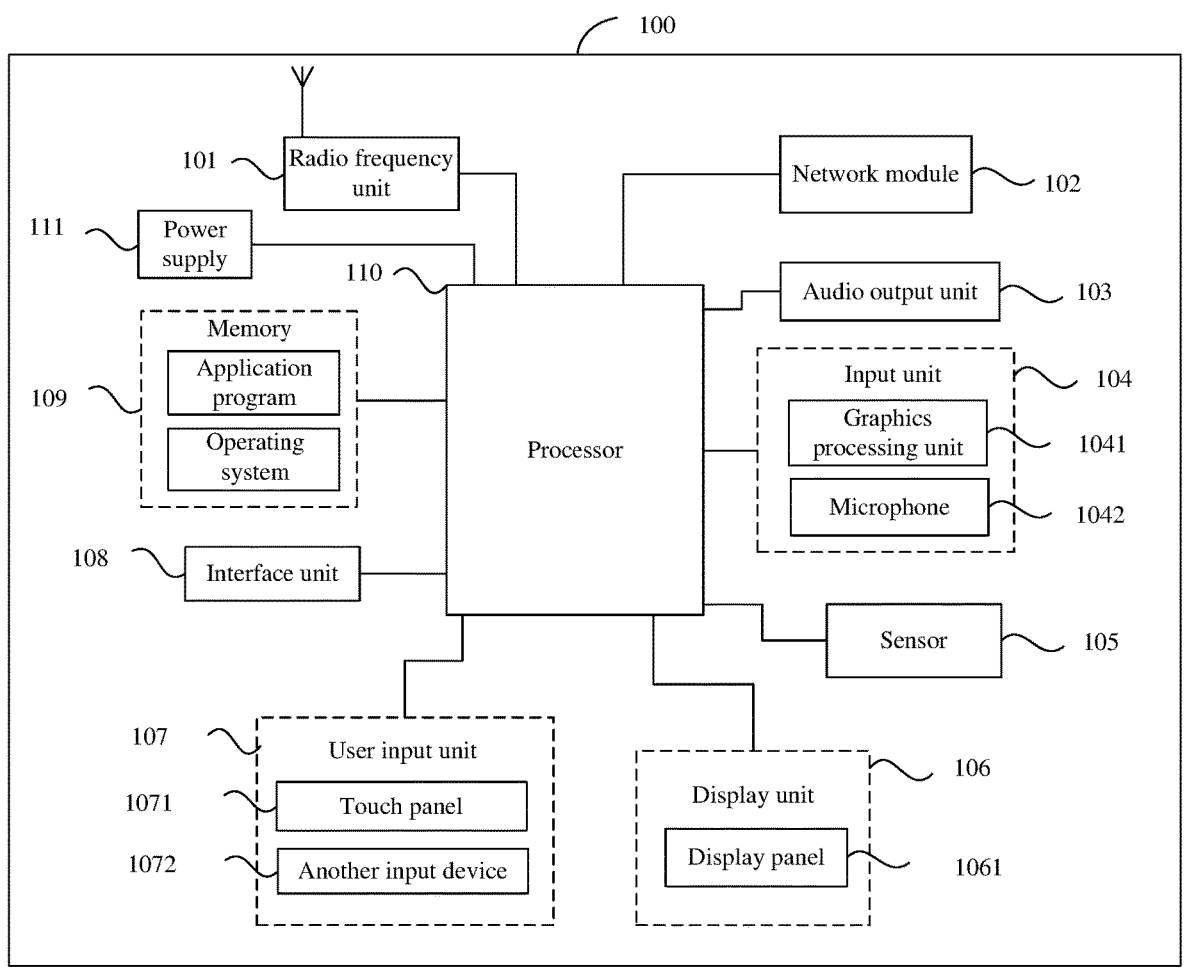
FIG. 4 is a second schematic structural diagram of a terminal device according to an embodiment of the present disclosure.

FIG. 4 is a schematic diagram of a hardware structure of a terminal device implementing the various embodiments of the present disclosure. The terminal device 100 includes, but not limited to: a radio frequency unit 101, a network module 102, an audio output unit 103, an input unit 104, a sensor 105, a display unit 106, a user input unit 107, an interface unit 108, a memory 109, a processor 110, a power supply 111, and the like. A person skilled in the art may understand that a structure of the terminal device 100 shown in FIG. 4 does not constitute a limitation on the terminal device, and the terminal device 100 may include more or fewer components than those shown in the figure, or combine some components, or have different component arrangements. In this embodiment of the present disclosure, the terminal device 100 includes but is not limited to a mobile phone, a tablet computer, a notebook computer, a palmtop computer, a vehicle-mounted terminal device, a wearable device, a pedometer, or the like.

The processor 110 is configured to obtain a target data transmission and/or reception volume of a target Wi-Fi module in the terminal device; determine a target listen interval of the target Wi-Fi module that corresponds to the target data transmission and/or reception volume, where a listen interval of the target Wi-Fi module is inversely proportional to the data transmission and/or reception volume; adjust the listen interval of the target Wi-Fi module to the target listen interval; and wake up the target Wi-Fi module according to the target listen interval in a case that the target Wi-Fi module is in a sleep state.

In the terminal device in the embodiments of the present disclosure, since the listen interval of the target Wi-Fi module is inversely proportional to the data transmission and/or reception volume, the terminal device in the embodiments of the present disclosure can determine a suitable target monitoring interval by obtaining the data transmission and/or reception volume of the target Wi-Fi module, and then adjust the listen interval of the target Wi-Fi module to the target monitoring interval. In this way, in a case that the target Wi-Fi module is in a sleep state, the target Wi-Fi module can be woken up according to the target listen interval, to extend the listen interval of the target Wi-Fi module in a case that data transmission is infrequent, and reduce the wake-up frequency in a case that the target Wi-Fi module is in a sleep state, to save power.

It should be understood that, in this embodiment of the present disclosure, the radio frequency unit 101 may be configured to receive and transmit information, or receive and transmit signals during a call. For example, the radio frequency unit receives downlink data from a base station, and transmits the downlink data to the processor 110 for processing; and in addition, transmits uplink data to the base station. Usually, the radio frequency unit 101 includes but is not limited to: an antenna, at least one amplifier, a transceiver, a coupler, a low-noise amplifier, a duplexer, and the like. In addition, the radio frequency unit 101 may further communicate with another communications device through a wireless communication system and network.

The terminal device 100 provides a user with wireless broadband Internet access through the network module 102, for example, helping the user to send and receive an e-mail, browse a web page, and access streaming media.

The audio output unit 103 may convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capturing apparatus (for example, a camera) in video capturing mode or image capturing mode. A processed image frame can be displayed on the display unit 106. The image frame processed by the graphics processing unit 1041 may be stored in the memory 109 (or another storage medium) or transmitted via the radio frequency unit 101 or the network module 102. The microphone 1042 may receive sound and can process the sound into audio data. The audio data obtained through processing may be converted, in a telephone call mode, into a format that can be sent to a mobile communications base station via the radio frequency unit 101 for output.

The terminal device 100 further includes at least one sensor 105, for example, an optical sensor, a motion sensor, and other sensors. For example, the optical sensor includes an ambient optical sensor and a proximity sensor. The ambient optical sensor may adjust luminance of a display panel 1061 based on brightness of an ambient light. The proximity sensor may turn off the display panel 1061 and/or a backlight in a case that the terminal device 100 is moved to an ear. As a type of the motion sensor, an accelerometer sensor may detect an acceleration value in each direction (generally, three axes), and detect a value and a direction of gravity in a case that the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information inputted by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device 100. For example, the user input unit 107 includes a touch panel 1071 and another input device 1072. The touch panel 1071 is also referred to as a touchscreen, and may collect a touch operation performed by a user on or near the touch panel (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 110, and receives and executes a command sent by the processor 110. In addition, the touch panel 1071 may be implemented in a plurality of forms such as a resistive type, a capacitive type, an infrared ray, and a surface acoustic wave. In addition to the touch panel 1071, the user input unit 107 may further include the another input device 1072. The another input device 1072 may include, but is not limited to, a physical keyboard, a function key (for example, a volume control key or a switch key), a trackball, a mouse, and a joystick. Details are not described herein again.

Optionally, the touch panel 1071 may cover the display panel 1061. When detecting a touch operation on or near the touch panel, the touch panel 1071 transmits the touch operation to the processor 110 to determine a type of a touch event. Then, the processor 110 provides corresponding visual output on the display panel 1061 based on the type of the touch event. In FIG. 4, the touch panel 1071 and the display panel 1061 are used as two independent components to implement input and output functions of the terminal device 100. However, in some embodiments, the touch panel 1071 and the display panel 1061 may be integrated to implement the input and output functions of the terminal device 100. This is not specifically limited herein.

The interface unit 108 is an interface for connecting an external apparatus with the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 109 may include a high-speed random access memory or a nonvolatile memory, for example, at least one magnetic disk storage device, a flash memory, or another volatile solid-state storage device.

The processor 110 is a control center of the terminal device 100, and connects all the components of the entire terminal device 100 by using various interfaces and lines. By running or executing a software program and/or a module that are/is stored in the memory 109 and by invoking data stored in the memory 109, the processor 110 performs various functions of the terminal device 100 and data processing, to perform overall monitoring on the terminal device 100. The processor 110 may include one or more processing units. Optionally, the processor 110 may be integrated with an application processor and a modem processor. The application processor mainly processes an operating system, a user interface, an application, and the like, and the modem processor mainly processes wireless communication. It can be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, an embodiment of the present disclosure further provides a terminal device, including a processor, a memory, and a computer program stored in the memory and executable on the processor 110. When the computer program is executed by the processor, the processes of embodiments of the terminal device control method are implemented, and same technical effects are achieved. To avoid repetition, details are not provided herein again.

An embodiment of the present disclosure further provides a non-transitory computer-readable storage medium. The non-transitory computer-readable storage medium stores a computer program, when the computer program is executed by a processor, the processes of the foregoing embodiments of the terminal device control method are implemented, and same technical effects can be achieved. To avoid repetition, details are not described herein again. The non-transitory computer-readable storage medium is, for example, a read-only memory (ROM), a random access memory (RAM), a magnetic disk, or an optical disk.

It should be noted that, in this specification, the terms "include", "include", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . ", without more constraints, does not preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

What is claimed is:

1. A terminal device control method, performed by a terminal device, wherein the method comprises:
    obtaining a target data transmission and/or reception volume of a target Wi-Fi module in the terminal device;
    determining a target listen interval of the target Wi-Fi module that corresponds to the target data transmission and/or reception volume, wherein a listen interval of the target Wi-Fi module is inversely proportional to the data transmission and/or reception volume;

adjusting the listen interval of the target Wi-Fi module to the target listen interval; and waking up the target Wi-Fi module according to the target listen interval in a case that the target Wi-Fi module is in a sleep state;

wherein before the waking up the target Wi-Fi module according to the target listen interval in a case that the target Wi-Fi module is in a sleep state, the method further comprises:

obtaining channel usage of the target Wi-Fi module;

determining a target inactive duration of the target Wi-Fi module that corresponds to the channel usage, wherein the channel usage of the target Wi-Fi module is directly proportional to an inactive duration;

adjusting an inactive duration of the target Wi-Fi module to the target inactive duration; wherein the inactive duration is a duration in which the target Wi-Fi module is in an inactive state of an awake state; and making the target Wi-Fi module to enter a sleep state after the target inactive duration.

2. The method according to claim 1, wherein the target data transmission and/or reception volume is a data transmission and/or reception volume of the target Wi-Fi module within a first predetermined time period.

3. The method according to claim 1, wherein the obtaining a target data transmission and/or reception volume of a target Wi-Fi module comprises:

periodically obtaining the target data transmission and/or reception volume of the target Wi-Fi module in a case that the target Wi-Fi module is in a sleep state.

4. The method according to claim 1, wherein the terminal device has at least two Wi-Fi modules, and the target Wi-Fi module is at least one of the at least two Wi-Fi modules.

5. The method according to claim 4, wherein before the obtaining a target data transmission and/or reception volume of a target Wi-Fi module in the terminal device, the method further comprises:

using a Wi-Fi module that meets a predetermined condition as the target Wi-Fi module;

wherein the predetermined condition comprises at least one of following: the Wi-Fi module has an active socket, or the Wi-Fi module is connected to a Wi-Fi access point.

6. A terminal device, comprising a processor, a memory, and a computer program stored in the memory and executable on the processor, wherein the computer program, when executed by the processor, causes the terminal device to perform:

obtaining a target data transmission and/or reception volume of a target Wi-Fi module in the terminal device;

determining a target listen interval of the target Wi-Fi module that corresponds to the target data transmission and/or reception volume, wherein a listen interval of the target Wi-Fi module is inversely proportional to the data transmission and/or reception volume;

adjusting the listen interval of the target Wi-Fi module to the target listen interval; and waking up the target Wi-Fi module according to the target listen interval in a case that the target Wi-Fi module is in a sleep state;

wherein the computer program, when executed by the processor, causes the terminal device to further perform:

obtaining channel usage of the target Wi-Fi module;

determining a target inactive duration of the target Wi-Fi module that corresponds to the channel usage, wherein the channel usage of the target Wi-Fi module is directly proportional to an inactive duration;

adjusting an inactive duration of the target Wi-Fi module to the target inactive duration; wherein the inactive duration is a duration in which the target Wi-Fi module is in an inactive state of an awake state; and making the target Wi-Fi module to enter a sleep state after the target inactive duration.

7. The terminal device according to claim 6, wherein the target data transmission and/or reception volume is a data transmission and/or reception volume of the target Wi-Fi module within a first predetermined time period.

8. The terminal device according to claim 6, wherein the computer program, when executed by the processor, causes the terminal device to perform:

periodically obtaining the target data transmission and/or reception volume of the target Wi-Fi module in a case that the target Wi-Fi module is in a sleep state.

9. The terminal device according to claim 6, wherein the terminal device has at least two Wi-Fi modules, and the target Wi-Fi module is at least one of the at least two Wi-Fi modules.

10. The terminal device according to claim 9, wherein the computer program, when executed by the processor, causes the terminal device to further perform:

using a Wi-Fi module that meets a predetermined condition as the target Wi-Fi module;

wherein the predetermined condition comprises at least one of following: the Wi-Fi module has an active socket, or the Wi-Fi module is connected to a Wi-Fi access point.

11. A non-transitory computer-readable storage medium, wherein the computer-readable storage medium stores a computer program, and the computer program, when executed by a processor of a terminal device, causes the terminal device to perform:

obtaining a target data transmission and/or reception volume of a target Wi-Fi module in the terminal device;

determining a target listen interval of the target Wi-Fi module that corresponds to the target data transmission and/or reception volume, wherein a listen interval of the target Wi-Fi module is inversely proportional to the data transmission and/or reception volume;

adjusting the listen interval of the target Wi-Fi module to the target listen interval; and waking up the target Wi-Fi module according to the target listen interval in a case that the target Wi-Fi module is in a sleep state;

wherein the computer program, when executed by the processor, causes the terminal device to further perform:

obtaining channel usage of the target Wi-Fi module;

determining a target inactive duration of the target Wi-Fi module that corresponds to the channel usage, wherein the channel usage of the target Wi-Fi module is directly proportional to an inactive duration;

adjusting an inactive duration of the target Wi-Fi module to the target inactive duration; wherein the inactive duration is a duration in which the target Wi-Fi module is in an inactive state of an awake state; and making the target Wi-Fi module to enter a sleep state after the target inactive duration.

12. The non-transitory computer-readable storage medium according to claim 11, wherein the target data transmission and/or reception volume is a data transmission and/or reception volume of the target Wi-Fi module within a first predetermined time period.

13. The non-transitory computer-readable storage medium according to claim 11, wherein the computer program, when executed by the processor, causes the terminal device to perform:
  periodically obtaining the target data transmission and/or reception volume of the target Wi-Fi module in a case that the target Wi-Fi module is in a sleep state.

14. The non-transitory computer-readable storage medium according to claim 11, wherein the terminal device has at least two Wi-Fi modules, and the target Wi-Fi module is at least one of the at least two Wi-Fi modules.

15. The non-transitory computer-readable storage medium according to claim 14, wherein the computer program, when executed by the processor, causes the terminal device to further perform:
  using a Wi-Fi module that meets a predetermined condition as the target Wi-Fi module;
  wherein the predetermined condition comprises at least one of following: the Wi-Fi module has an active socket, or the Wi-Fi module is connected to a Wi-Fi access point.

* * * * *